US009134513B2

(12) United States Patent
Chen et al.

(10) Patent No.: US 9,134,513 B2
(45) Date of Patent: Sep. 15, 2015

(54) PROJECTION LENS, PROJECTION DEVICE AND OPTICALLY-INDUCED MICROPARTICLE DEVICE

(71) Applicant: Industrial Technology Research Institute, Hsinchu (TW)

(72) Inventors: Hsiu-Hsiang Chen, Hsinchu County (TW); Hsin-Hsiang Lo, Hsinchu County (TW); Chun-Chuan Lin, Hsinchu (TW); Chi-Shen Chang, Hsinchu County (TW); Jyh-Chern Chen, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 360 days.

(21) Appl. No.: 13/864,207

(22) Filed: Apr. 16, 2013

(65) Prior Publication Data
US 2014/0126039 A1 May 8, 2014

(30) Foreign Application Priority Data

Nov. 6, 2012 (TW) .............................. 101141202 A

(51) Int. Cl.
*G02B 13/16* (2006.01)
*G02B 9/34* (2006.01)
*B03C 5/00* (2006.01)

(52) U.S. Cl.
CPC ................ *G02B 13/16* (2013.01); *B03C 5/005* (2013.01); *G02B 9/34* (2013.01); *B03C 2201/26* (2013.01)

(58) Field of Classification Search
CPC ........ G02B 13/16; G02B 15/00; G02B 15/02; G02B 15/06; G02B 15/08; G02B 21/142; G02B 2205/0046; B03C 5/005
See application file for complete search history.

(56) References Cited

U.S. PATENT DOCUMENTS 5,703,729 A * 12/1997 Takeda et al. ................. 359/821
7,612,355 B2    11/2009 Wu et al.
(Continued)

FOREIGN PATENT DOCUMENTS

CN        201075104       6/2008
CN        101331429       12/2008
(Continued)

OTHER PUBLICATIONS

Pei Yu Chiou, et al., "Massively parallel manipulation of single cells and microparticles using optical images", Nature, vol. 436, Jul. 2005, pp. 370-372.
(Continued)

*Primary Examiner* — Joseph P Martinez
(74) *Attorney, Agent, or Firm* — Jianq Chyun IP Office

(57) ABSTRACT

A projection lens, a projection device and an optically-induced microparticle device are provided. The projection lens includes an aperture, a first and a second lens groups. The aperture, the first and the second lens groups are disposed on a projection path of an image. The aperture is between the first and the second lens groups. The first and the second lens groups are suitable for interchanging with each other to switch the magnification ratio. When in a first state, the first lens group is between the object and the aperture and the second lens group is between the aperture and a projection surface, herein the projection lens has a first magnification ratio. When in a second state, the first lens group is between the aperture and the projection surface, and the second lens group is between the object and the aperture, herein the projection lens has a second magnification ratio.

13 Claims, 6 Drawing Sheets

(56) References Cited

U.S. PATENT DOCUMENTS

| | | | |
|---|---|---|---|
| 7,745,221 | B2 | 6/2010 | Butler et al. |
| 2003/0008364 | A1 | 1/2003 | Wang et al. |
| 2009/0225445 | A1 | 9/2009 | Sueyoshi |
| 2010/0051465 | A1 | 3/2010 | Lee et al. |

FOREIGN PATENT DOCUMENTS

| | | |
|---|---|---|
| CN | 101604113 | 12/2009 |
| CN | 201828704 | 5/2011 |
| CN | 102370455 | 3/2012 |
| CN | 102608735 | 7/2012 |
| CN | 202433659 U | 9/2012 |
| EP | 2241918 | 10/2010 |
| JP | 2010008577 | 1/2010 |
| JP | 2011248049 | 12/2011 |
| TW | I252312 | 4/2006 |
| TW | 201009332 | 3/2010 |
| TW | 201204314 | 2/2012 |

OTHER PUBLICATIONS

Aaron Takami Ohta, et al., "Dynamic Cell and Microparticle Control via Optoelectronic Tweezers", IEEE, Journal of Microelectromechanical Systems, vol. 16, No. 3, Jun. 2007, pp. 491-499.

Marco Hoeb, et al., "Light-Induced Dielectrophoretic Manipulation of DNA", Biophysical Journal, vol. 93, Aug. 2007, pp. 1032-1038.

Wonjae Choi, et al., "Programmable manipulation of motile cells in optoelectronic tweezers using a grayscale image", Applied Physics Letters, vol. 93, 2008, pp. 143901-1-143901-3.

Wang-Ying Lin, et al., "Separation of micro-particles utilizing spatial difference of optically induced dielectrophoretic forces", Microfluid Nanofluid, vol. 8, 2010, pp. 217-229.

Hsan-Yin Hsu, et al., "Phototransistor-based optoelectronic tweezers for dynamic cell manipulation in cell culture media", Lab on a Chip, vol. 10, 2010, pp. 165-172.

"Office Action of Taiwan Counterpart Application", issued on Nov. 3, 2014, p. 1-p. 5.

"Office Action of China Counterpart Application," issued on Jul. 3, 2015, pp. 1-7.

* cited by examiner

PROJECTION LENS, PROJECTION DEVICE AND OPTICALLY-INDUCED MICROPARTICLE DEVICE

CROSS-REFERENCE TO RELATED APPLICATION

This application claims the priority benefit of Taiwan application serial no. 101141202, filed on Nov. 6, 2012. The entirety of the above-mentioned patent application is hereby incorporated by reference herein and made a part of this specification.

TECHNICAL FIELD

The present disclosure relates to a projection lens, a projection device and an optically-induced microparticle device. More particularly, the present disclosure relates to a projection lens and a projection device and an optically-induced microparticle device using the same.

BACKGROUND

In diagnosis and therapeutic method of biomedical science, especially in applications of detecting tumor cells, stem cells, embryos or bacteria, how to separate cells effectively and not to destroy cells are quite important. Hence, controlling and analyzing technologies applied in biomolecule field have been widely studied in recent years.

Conventional controlling technology such as optical tweezers, electrophoresis, dielectrophoresis, travelling-wave dielectrophoresis, electrorotation, magnetic tweezers, acoustic traps and hydrodynamic flows cannot reach high resolution and high flux at the same time. Although the technology of optical tweezers can achieve high resolution so as to capture single particle, the operation area is only about 100 µm and the light energy intensity is up to $10^7$ W/cm$^2$. It is easy to overheat in local area and cause cells death or deactivation. Therefore, optical tweezers is not suitable for long time operation. Besides, although electrophoresis force and dielectrophoresis force can achieve high flux, they cannot control single cell due to lack of space resolution. In addition, the dielectrophoresis flow field chip only has one function (for example, transmitting function or separating function) in general. While designing the dielectrophoresis flow field chip with different flow field, it needs to redesign a set of light mask and execute many complicated manufacturing process such as deposition, photolithography and etching to manufacture fixed electrodes. Therefore, it demands considerable cost, time and human resource.

Accordingly, a controlling technology using an optically-induced dielectrophoresis force to control particles performing dielectrophoretic motion has been provided. It mainly utilizes an optically-induced dielectrophoresis image system to project an optical pattern on the optically-induced dielectrophoresis operation platform having photoconducting material and to change dielectrophoresis flow field immediately according to the appearance and trajectory speed of the image so as to achieve the features of controlling single cell and identifying a large number of cells within a short period of time. The controlling technology using the optically-induced dielectrophoresis force can achieve high resolution and high flux and simplify the complicated processes of precondition for bio-specimen previously.

However, a projection path of the conventional optically-induced dielectrophoresis image system is quite complicated. The projection path is from a projector aiming at one object lens to a chip, and then the light projected to the chip aims at another object lens to couple with a charge-coupled device so as to form an image. Besides, because a displaying image cannot be projected on the chip completely, the full displaying image cannot be watched in the conventional optically-induced dielectrophoresis image system.

SUMMARY

One of exemplary embodiments provides a projection lens capable of projecting an image of an object on a projection surface. The projection lens comprises a first lens group, a second lens group, and an aperture. The first lens group is disposed on a projection path of the image. The second lens group is adapted to be disposed on the projection path of the image. The aperture is disposed on the projection path of the image and located between the first lens group and the second lens group. The first lens group and the second lens group are suitable for interchanging with each other to switch magnification ratio of the image provided by the projection lens. The projection lens has a first magnification ratio in a first state, when the first lens group is located between the object and the aperture, and the second lens group is located between the aperture and the projection surface. The projection lens has a second magnification ratio in a second state, when the first lens group is located between the projection surface and the aperture, and the second lens group is located between the aperture and the object. The first magnification ratio is different from the second magnification ratio.

One of exemplary embodiments provides a projection device capable of projecting an image on a projection surface as a displaying image. The projection device comprises an image unit and a projection lens. The image unit is adapted to generate the image. The projection lens is disposed on a projection path of the image and located between the image unit and the projection surface so as to form the displaying image by projecting the image on the projection surface. The projection lens comprises a first lens group, a second lens group, and an aperture. The first lens group is disposed on the projection path of the image. The second lens group is adapted to be disposed on the projection path of the image. The aperture is disposed on the projection path of the image and located between the first lens group and the second lens group. The first lens group and the second lens group are suitable for interchanging with each other to switch magnification ratio of the image provided by the projection lens. The projection lens has a first magnification ratio in a first state, when the first lens group is located between the image unit and the aperture, and the second lens group is located between the aperture and the projection surface. The projection lens has a second magnification ratio in a second state, when the first lens group is located between the projection surface and the aperture, and the second lens group is located between the aperture and the image unit. The first magnification ratio is different from the second magnification ratio.

One of exemplary embodiments provides an optically-induced microparticle device comprising an optically-induced dielectrophoresis plate, an image unit, a projection lens and a control unit and an image capturing unit. The optically-induced dielectrophoresis plate is adapted to generate an optically-induced dielectrophoresis force to drive a plurality of micro particles performing dielectrophoretic motion. The image unit is adapted to generate an image of an object. The projection lens is disposed on a projection path of the image and located between the image unit and the optically-induced dielectrophoresis plate so as to form a displaying image by projecting the image on the projection surface so that the optically-induced dielectrophoresis plate generates the optically-induced dielectrophoresis force. The projection lens comprises a first lens group, a second lens group, and an aperture. The first lens group is disposed on the projection path of the image. The second lens group is adapted to be disposed on the projection path of the image. The aperture is disposed on the projection path of the image and located between the first lens group and the second lens group. The first lens group and the second lens group are suitable for interchanging with each other to switch magnification ratio of the image provided by the projection lens. The projection lens has a first magnification ratio in a first state, when the first lens group is located between the image unit and the aperture, and the second lens group is located between the aperture and the projection surface. The projection lens has a second magnification ratio in a second state, when the first lens group is located between the projection surface and the aperture, and the second lens group is located between the aperture and the image unit. The first magnification ratio is different from the second magnification ratio. The control unit is coupled to the projection lens so as to control the displaying image projected by the projection lens. The image-capturing unit is coupled to the control unit and captures moving images of the plurality of microparticles.

In order to make the aforementioned and other features of the present invention more comprehensible, several embodiments accompanied with figures are described in detail below.

DETAILED DESCRIPTION OF EMBODIMENTS

Figure 1:
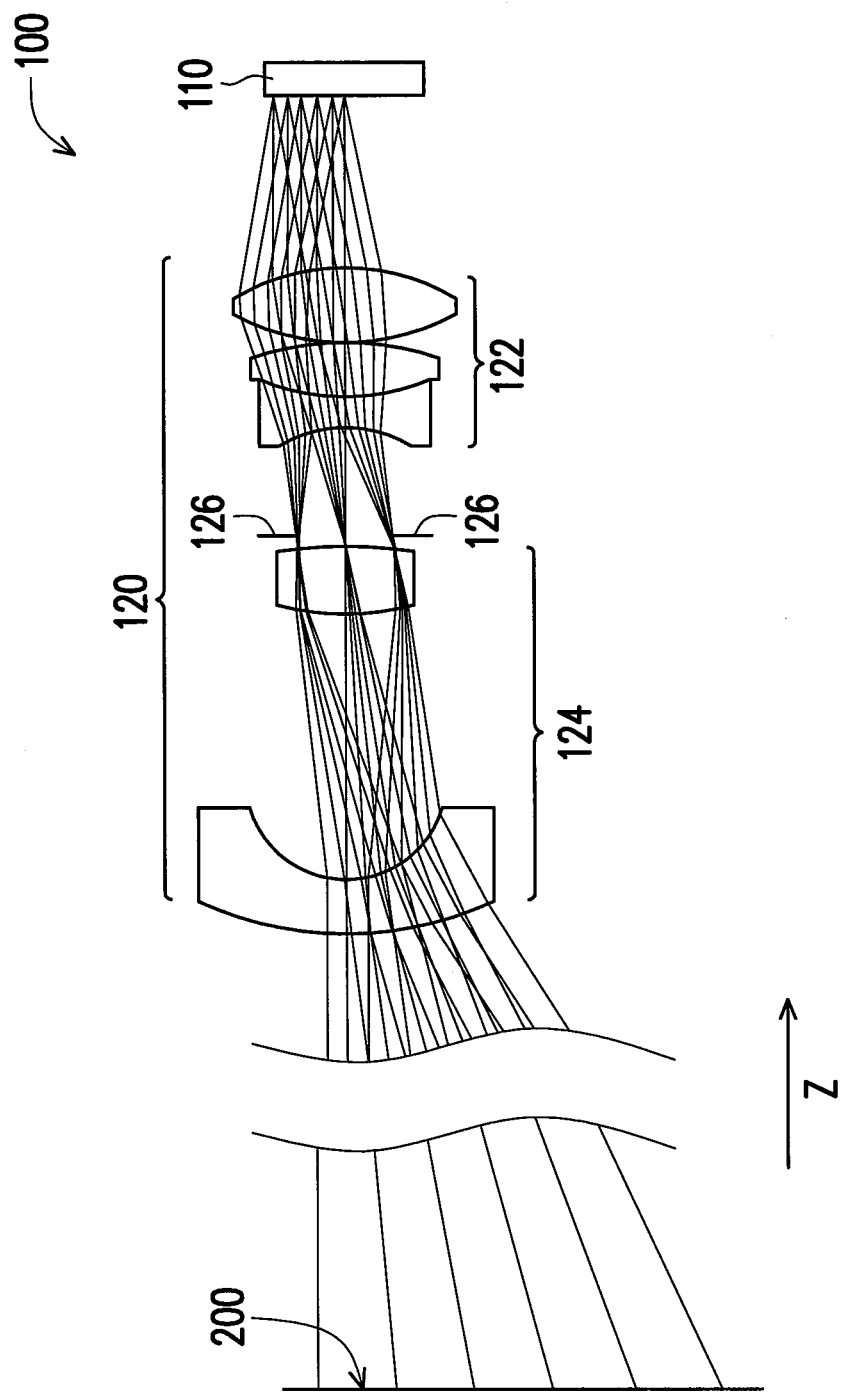
FIG. 1 is a schematic diagram of a projection device in a first state according to an embodiment of the disclosure.
Figure 2:
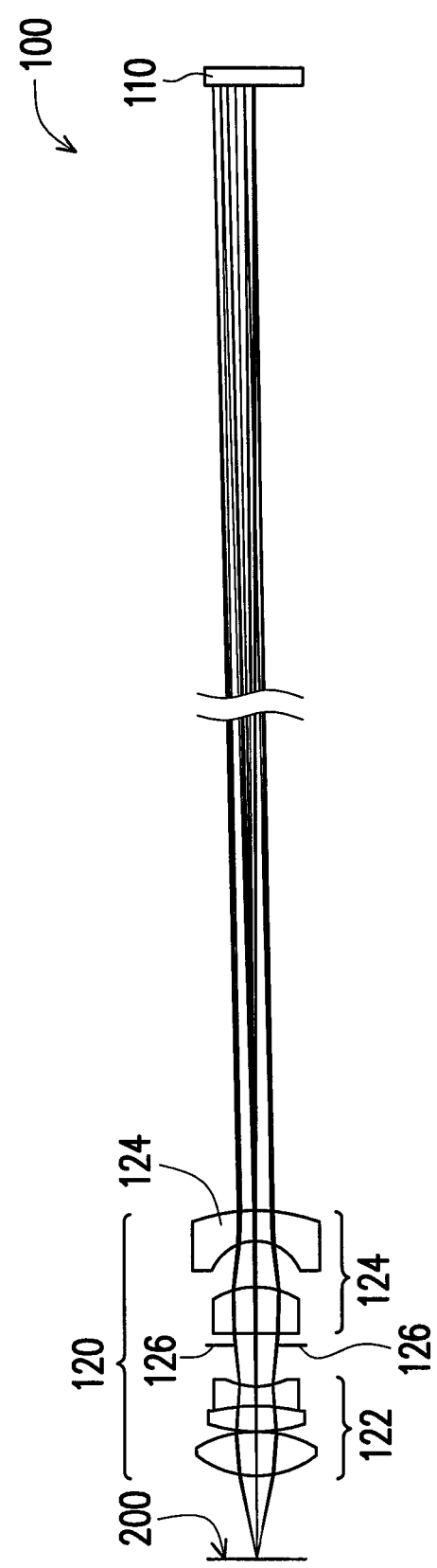
FIG. 2 is a schematic diagram of a projection device in a second state according to an embodiment of the disclosure.

FIG. 1 is a schematic diagram of a projection device in a first state according to an embodiment of the disclosure. FIG. 2 is a schematic diagram of a projection device in a second state according to an embodiment of the disclosure. Referring to FIG. 1 and FIG. 2, a projection device 100 of the embodiment is capable of projecting an image of an object on a projection surface 200 to form a displaying image. The projection device 100 comprises an image unit 110 and a projection lens 120. The image unit 110 is adapted to generate and display the image of the object. In the embodiment, the image unit 110 comprises an element capable of displaying image such as liquid crystal display (LCD), liquid crystal on silicon panel (LCOS), digital micro-mirror device (DMD) or organic light-emitting diode (OLED), etc. The projection lens 120 is disposed on a projection path of the image mentioned above, and the projection lens 120 is located between the image unit 110 and the projection surface 200 so as to form the displaying image by projecting the image on the projection surface. The projection lens 120 comprises a first lens group 122, a second lens group 124, and an aperture 126. The first lens group 122, the second lens group 124, and the aperture 126 are respectively disposed on the projection path of the image, and the aperture 126 is located between the first lens group 122 and the second lens group 124. The first lens group 122 and the second lens group 124 are suitable for interchanging with each other to switch magnification ratio of the image provided by the projection lens 120.

Specifically, as shown in FIG. 1, when the projection lens 120 is in a first state, the first lens group 122 is located between the image unit 110 and the aperture 126, the second lens group 124 is located between the aperture 126 and the projection surface 200, and the projection lens 120 has a first magnification ratio. As shown in FIG. 2, when the projection lens 120 is in a second state, the first lens group 122 is located between the projection surface 200 and the aperture 126, the second lens group 124 is located between the aperture 126 and the image unit 110, and the projection lens 120 has a second magnification ratio, wherein the first magnification ratio is different from the second magnification ratio. In the embodiment, the first magnification ratio is greater than 1, and the second magnification ratio is less than 1. For example, when the projection lens 120 is disposed as the way shown in FIG. 1, the magnification ratio of the projection lens 120 is 10. When the projection lens 120 is disposed as the way shown in FIG. 2, the magnification ratio of the projection lens 120 is 0.1.

For instance, an image circle which is defined as a diagonal length of the image unit 110 is 14 mm, and an equivalent focal length of the first lens group 122 and the second lens group 124 is 17.63 mm. The detailed parameters of the first lens group 122 and the second lens group 124 are shown in the following table 1. When the first lens group 122 is located between the image unit 110 and the aperture 126 and the second lens group 124 is located between the aperture 126 and the projection surface 200, the magnification ratio of the projection lens 120 is 10. When the first lens group 122 and the second lens group 124 have the same parameters as shown in table 1 and the image circle is also 14 mm, if the first lens group 122 and the second lens group 124 are interchanged with each other, that is, the first lens group 122 is located between the projection surface 200 and the aperture 126, and the second lens group 124 is located between the aperture 126 and the image unit 110, the magnification ratio of the projection lens 120 is 0.1.

TABLE 1

| Surface | Radius of Curvature (mm) | Thickness (mm) | Material (n, V) | conic constant (k) | a-spherical coefficient (A4) | a-spherical coefficient (A6) | a-spherical coefficient (A8) |
| --- | --- | --- | --- | --- | --- | --- | --- |
| 0 | ∞ | 150 | | | | | |
| 1 | 9.876157 | 5 | 1.5356, 56 | −0.87164 | −5.42E−005 | −6.37E−07 | 2.14E−09 |
| 2 | 5.408633 | 12.7951 | | −0.86402 | −0.00013886247 | −2.70E−06 | 1.27E−08 |

TABLE 1-continued

| Surface | Radius of Curvature (mm) | Thickness (mm) | Material (n, V) | conic constant (k) | a-spherical coefficient (A4) | a-spherical coefficient (A6) | a-spherical coefficient (A8) |
|---|---|---|---|---|---|---|---|
| 3 | 17.92149 | 3.776102 | 1.77, 49.6 | | | | |
| 4 | −938.597 | 7.771521 | | | | | |
| 5 | ∞ | 5.405857 | | | | | |
| 6 | −8.57906 | 3 | 1.85, 23.8 | | | | |
| 7 | −108.036 | 5.375016 | 1.50, 81.1 | | | | |
| 8 | −11.7355 | 0.1 | | | | | |
| 9 | 20.02679 | 8.059827 | 1.53, 56 | −2.57878 | −1.00e−005 | 1.28E−07 | −4.34E−10 |
| 10 | −14.8362 | 18.71721 | | −0.00347 | 8.09e−005 | 1.55E−08 | 6.268E−10 |

It should be mentioned that the numbers of the surface in the first column from the left of table 1 respectively represent the surfaces of lens from left to right arranged sequentially as shown in FIG. 1, wherein number 0 represents the projection surface 200, analogically for the rest numbers. With respect to the material in the fourth column from the left of the table 1, n represents refractive index of lens, and V represents Abbe number. With respect to K, A4, A6 and A8 from the fifth column to the eighth column from the left of the table 1 represent aspheric coefficients of the following curved equation (1), respectively.

$$\text{Curved equation:} z = \frac{cr^2}{1 + \sqrt{1 - (1+k)c^2 r^2}} + A_4 r^4 + A_6 r^6 + A_8 r^8 \quad (1)$$

Wherein c represents the reciprocal of curvature radius of lens, r represents semi-diameter of lens, k represents conic constant, A4, A6 and A8 represent a-spherical coefficients, and z represents coordinate (a direction of z axis is shown in FIG. 1).

As description above, due to the feature that the first lens group 122 and the second lens group 124 of the projection lens 120 are suitable for interchanging with each other, the magnification ratio of the image provided by the projection lens 120 can be switched. For example, if the first lens group 122 and the second lens group 124 are disposed as the way shown in FIG. 1, the projection device 100 is in a magnifying state (the magnification ratio is greater than 1). The projection device 100 can be switched to a minifying state (the magnification ratio is less than 1) by interchanging the first lens group 122 and the second lens group 124 as shown in FIG. 2, adjusting the focal lengths of the first lens group 122 and the second lens group 124 and the distance between the second lens group 124 and the image unit 110.

Figure 3:
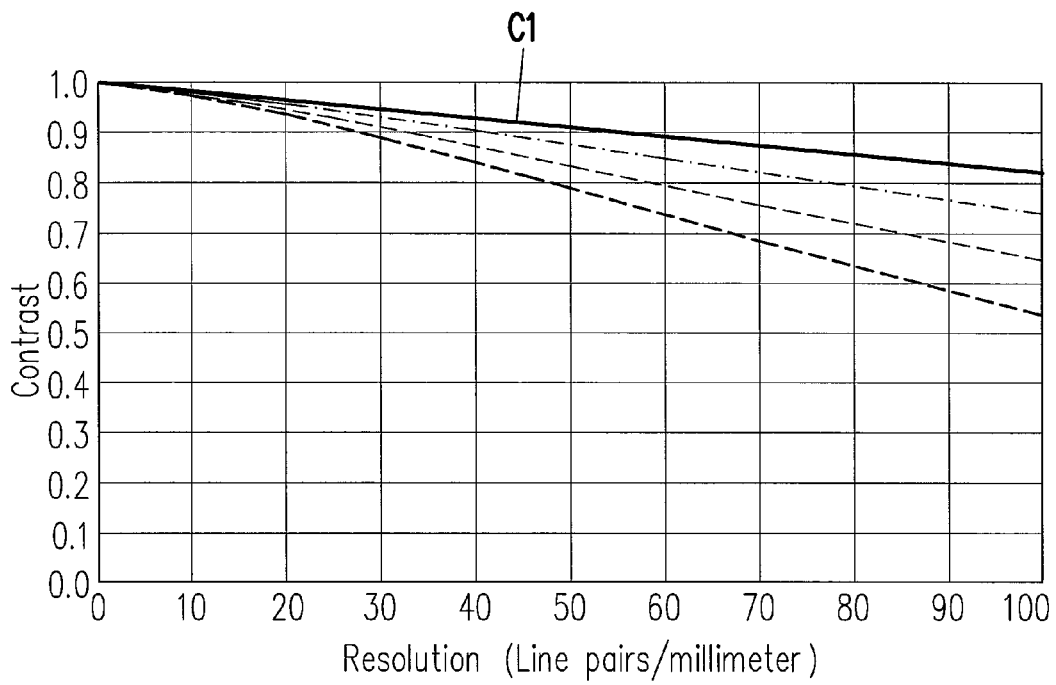
FIG. 3 is a modulation transfer function curve diagram of the projection device of FIG. 1.
Figure 4:
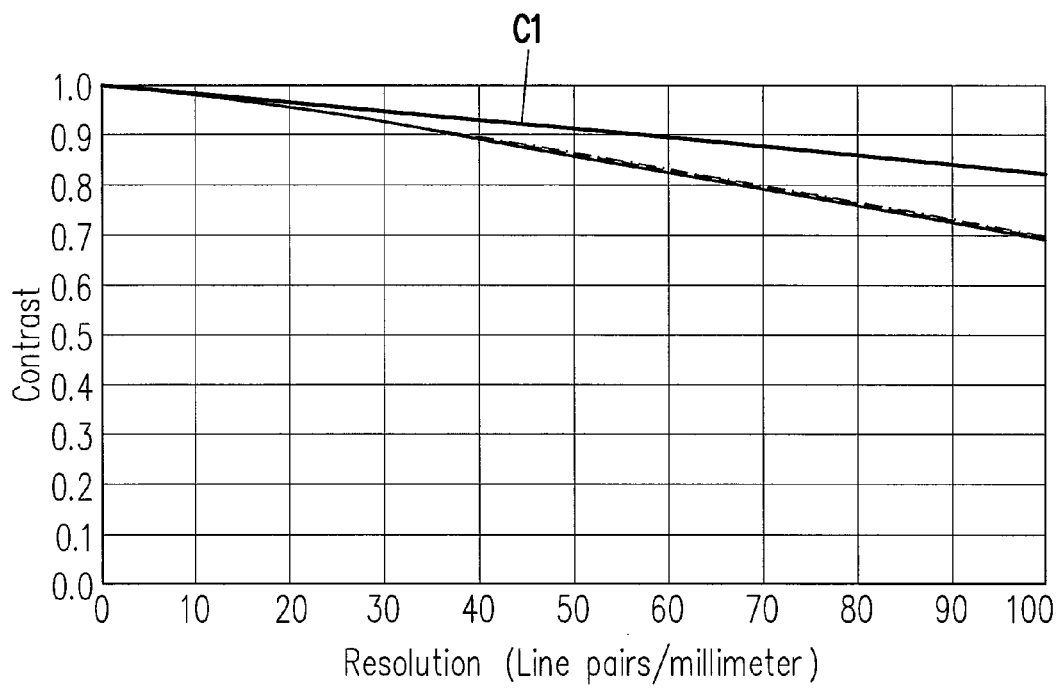
FIG. 4 is a modulation transfer function curve diagram of the projection device of FIG. 2.

FIG. 3 is a modulation transfer function curve diagram of the projection device of FIG. 1. FIG. 4 is a modulation transfer function curve diagram of the projection device of FIG. 2. The vertical axis of the modulation transfer function curve diagram represents contrast, and the horizontal axis of the modulation transfer function curve diagram represents resolution (Line pairs per millimeter, LP/mm) Referring to FIG. 3, the projection lens 120 disposed as the way shown in FIG. 1 is in the magnifying state. In FIG. 3, the upper curved line C1 represents the ideal modulation transfer function curve of the projection lens influenced by the diffraction limit, and other dotted lines represent the actual modulation transfer function curve of the projection lens 120 under different image heights. As shown in FIG. 3, in the embodiment, the actual modulation transfer function curves of the projection lens 120 under different image heights are close to the ideal modulation transfer function curve. In other words, the magnified projection of the projection lens 120 disposed as the way shown in FIG. 1 has good imaging quality. Similarly, referring to FIG. 4, the projection lens 120 disposed as the way shown in FIG. 2 is in the minifying state. In FIG. 4, the upper curved line C1 represents the ideal modulation transfer function curve of the projection lens influenced by the diffraction limit, and other dotted lines represent the actual modulation transfer function curves of the projection lens 120 under different image heights. As shown in FIG. 4, in the embodiment, the actual modulation transfer function curves of the projection lens 120 under different image heights are close to the ideal modulation transfer function curve. In other words, the minified projection of the projection lens 120 disposed as the way shown in FIG. 2 has good imaging quality.

Figure 5:
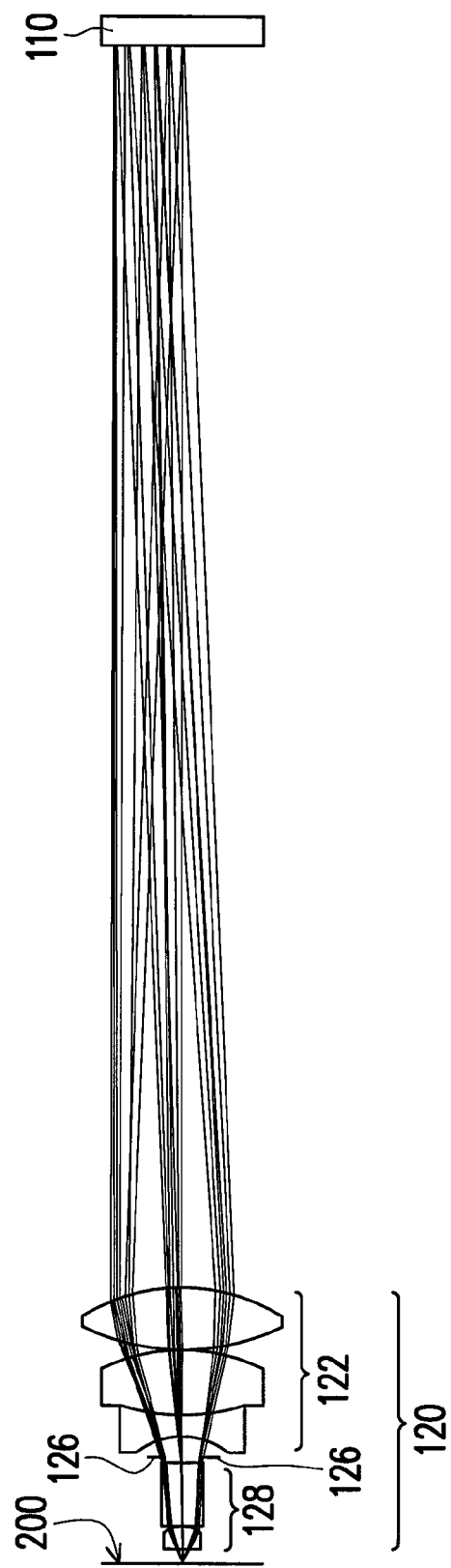
FIG. 5 is a schematic diagram of a projection device in a third state according to an embodiment of the disclosure.

FIG. 5 is a schematic diagram of a projection device in a third state according to an embodiment of the disclosure. Referring to FIGS. 1 and 5, in the embodiment, the projection lens 120 further comprises a third lens group 128 which is adapted to replace the second lens group 124. As shown in FIG. 5, when the projection lens 120 is in a third state, the first lens group 122 is located between the image unit 110 and the aperture 126, the third lens group 128 replacing the second lens group 124 of FIG. 1 is located between the aperture 126 and the projection surface 200, and the projection lens 120 has a third magnification ratio. The first magnification ratio is different from the third magnification ratio. In the embodiment, the first magnification ratio is greater than 1, and the third magnification ratio is less than 1.

For instance, a focal length of the first lens group 122 is 25.29 mm, a focal length of the second lens group 124 is 26.78 mm, and an equivalent focal length of the first lens group 122 and the second lens group 124 is 19.82 mm. The detailed parameters of the first lens group 122 and the second lens group 124 are shown in the following table 2. An image circle which is defined as a diagonal length of the image unit 110 is 14 mm. The first lens group 122 and the second lens group 124 are disposed as the way shown in FIG. 1. That is, the first lens group 122 is located between the image unit 110 and the aperture 126, the second lens group 124 is located between the aperture 126 and the projection surface 200, and the magnification ratio of the projection lens 120 is 26.23. When the first lens group 122 has the same parameters as shown in table 2 and the image circle is also 14 mm, if replacing the second lens group 124 with the third lens group 128 whose focal length is 22.38 mm, that is, the third lens group 128 replaces the second lens group 124 and is located between the aperture 126 and the image unit 110. Herein, an equivalent focal length of the first lens group 122 and the third lens group 128 is 17.2 mm, and the magnification ratio of the projection lens 120 is 0.2. The detailed parameters of the first lens group 122 and the third lens group 128 are shown in the following table 3. It is noted that, the related parameters in tables 2 and 3 can refer to those in table 1 and the curved equation (1), except the first column (surface) from the left of table 3, the numbers respectively represent surface of lens arranged sequentially as shown in FIG. 5, wherein number 0 represents the projection surface 200, analogically for the rest numbers.

TABLE 2

| Surface | Radius of Curvature (mm) | Thickness (mm) | Material (n, V) | conic constant (k) | a-spherical coefficient (A4) | a-spherical coefficient (A6) |
| --- | --- | --- | --- | --- | --- | --- |
| 0 | ∞ | 500 | | | | |
| 1 | ∞ | 0.6 | | | | |
| 2 | 18.20013 | 7 | 1.72, 38.0 | −1.038328 | | |
| 3 | 7.9759 | 16.10581 | | −0.6523937 | | |
| 4 | 16.35992 | 7.000469 | 1.73, 54.7 | | | |
| 5 | −93.8475 | 0.954016 | | | | |
| 6 | ∞ | 11.78154 | | | | |
| 7 | −8.19784 | 2.146288 | 1.78, 25.7 | | | |
| 8 | 59.29547 | 5.736609 | 1.68, 54.9 | | | |
| 9 | −17.3499 | 0.1 | | | | |
| 10 | 24.58653. | 6.368737 | 1.53, 56 | −5.70823 | 6.02E−07 | −2.59E−09 |
| 11 | −16.1125 | 19.86221 | | −1.438124 | 5.93E−08 | −7.88E−10 |

TABLE 3

| Surface | Radius of Curvature (mm) | Thickness (mm) | Material (n, V) | conic constant (k) | a-spherical coefficient (A4) | a-spherical coefficient (A6) |
| --- | --- | --- | --- | --- | --- | --- |
| 0 | ∞ | 1 | | | | |
| 1 | ∞ | 0.6 | | | | |
| 2 | −8.62136 | 7.003081 | 1.72, 38.0 | 5.04275 | | |
| 3 | −20.4833 | 0.492507 | | −12.90792 | | |
| 4 | 11.67706 | 6.999496 | 1.73, 54.7 | | | |
| 5 | 233.4015 | 2.1894 | | | | |
| 6 | ∞ | 2.706467 | | | | |
| 7 | −8.19784 | 2.146288 | 1.78, 25.7 | | | |
| 8 | 59.29547 | 5.736609 | 1.68, 54.9 | | | |
| 9 | −17.3499 | 0.1 | | | | |
| 10 | 24.58653. | 6.368737 | 1.53, 56 | −5.70823 | 6.02E−07 | −2.59E−09 |
| 11 | −16.1125 | 19.86221 | | −1.438124 | 5.93E−08 | −7.88E−10 |

It should be mentioned that the definition of each parameter in tables 2 and 3 can refer to that in table 1, and is not reiterated herein.

As mentioned above, the projection device 100 of the embodiment can switch the magnification ratio of the projection lens 120 by not only interchanging the first lens group 122 and the second lens group 124 of the projection lens 120 with each other, but also replacing the second lens group 124 with the third lens group 128. For example, if the first lens group 122 and the second lens group 124 are disposed as the way shown in FIG. 1, the projection device 100 is in a magnifying state (the magnification ratio is greater than 1). The projection device 100 can be switched to a minifying state (the magnification ratio is less than 1) by replacing the second lens group 124 with the third lens group 128 and adjusting the focal length of the third lens group 128 and the distance between the third lens group 128 and the image unit 110 correspondingly.

Figure 6:
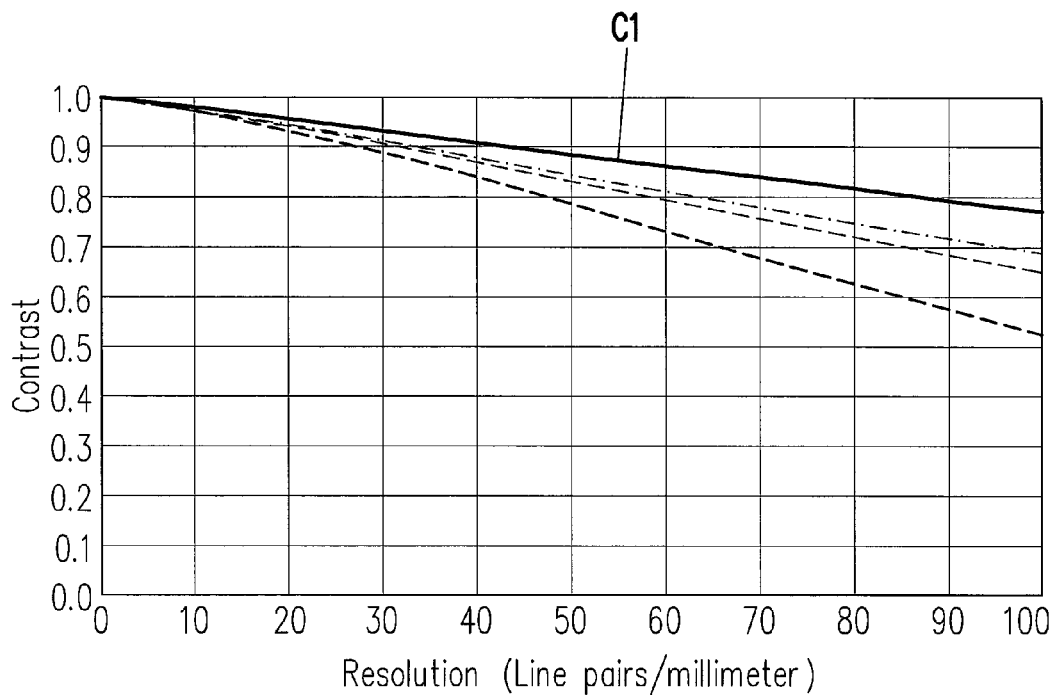
FIG. 6 is a modulation transfer function curve diagram of the projection device in a first state according to an embodiment of the disclosure.
Figure 7:
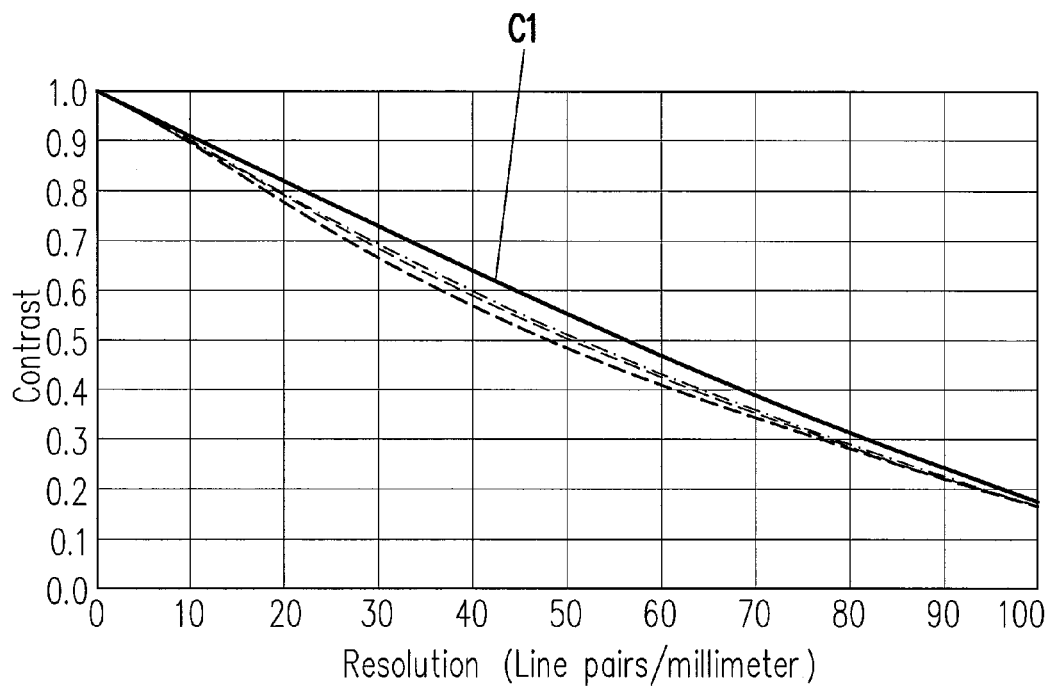
FIG. 7 is a modulation transfer function curve diagram of the projection device in a third state according to an embodiment of the disclosure.

FIG. 6 is a modulation transfer function curve diagram of the projection device in a first state according to an embodiment of the disclosure. FIG. 7 is a modulation transfer function curve diagram of the projection device in a third state according to an embodiment of the disclosure. Referring to FIG. 6, in the embodiment, when the projection device 100 is in the first state, that is, when the first lens group 122 is located between the image unit 110 and the aperture 126 and the second lens group 124 is located between the aperture 126 and the projection surface 200, the projection lens is in the magnifying state. In FIG. 6, the upper curved line C1 represents the ideal modulation transfer function curve of the projection lens influenced by the diffraction limit, and other dotted lines represent the actual modulation transfer function curves of the projection lens 120 under different image heights. As shown in FIG. 6, the actual modulation transfer function curves of the projection lens 120 under different image heights are close to the ideal modulation transfer function curve. In other words, the magnified projection of the projection lens 120 disposed as the way shown in FIG. 1 has good imaging quality. Similarly, referring to FIG. 7, in the embodiment, when the projection device 100 is in the third state, that is, replacing the second lens group 124 with the third lens group 128, the projection lens is in the minifying state. In FIG. 7, the upper curved line C1 represents the ideal modulation transfer function curve of the projection lens influenced by the diffraction limit, and other dotted lines represent the actual modulation transfer function curves of the projection lens 120 under different image heights. As shown in FIG. 7, the actual modulation transfer function curves of the projection lens 120 under different image heights are close to the ideal modulation transfer function curve. In other words, the minified projection of the projection lens 120 disposed as the way shown in FIG. 5 has good imaging quality.

Thus, the projection device 100 can control dimensions of the displaying image projected on the projection surface 200 by adjusting the positions of the first lens group 122 and the second lens group 124 or the positions of the first lens group 122 and the third lens group 128 so as to improve the multi-functionality of the projection device 100 and make the dimensions of the displaying image conform with the dimensions of the projection surface 200 to achieve the effect of full displaying image projection.

Figure 8:
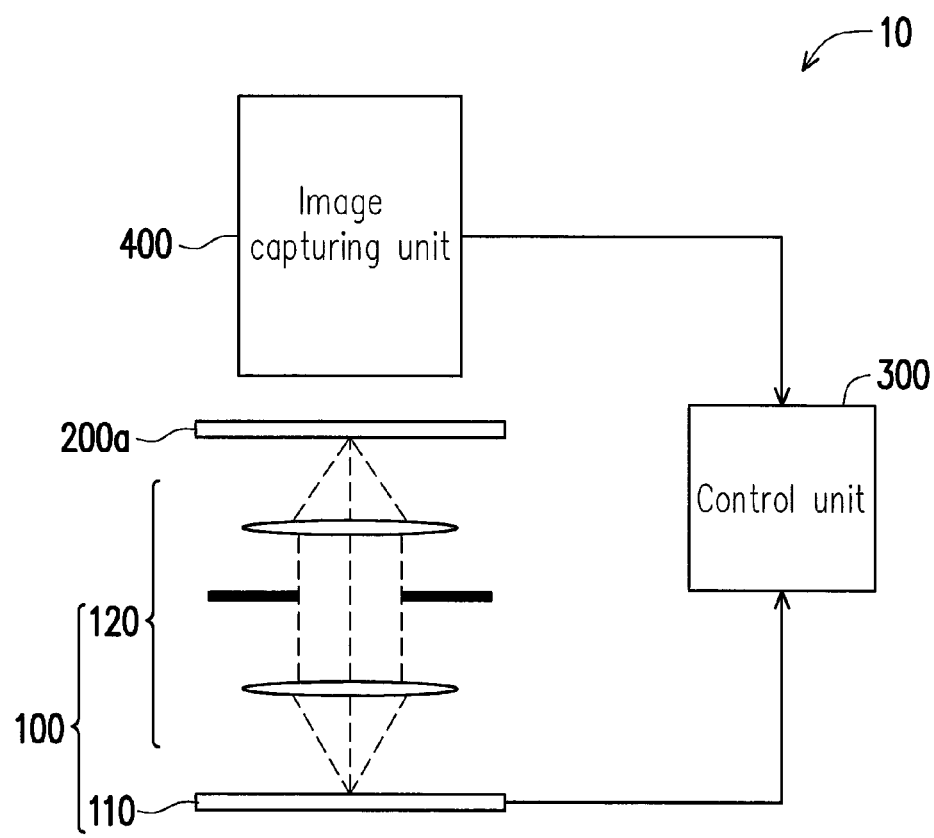
FIG. 8 is a schematic view of an optically-induced microparticle device according to an embodiment of the disclosure.

The projection device 100 not only can be applied to normal projection systems such as home theaters but also applied to an optically-induced micro-particle device in biomedical field. FIG. 8 is a schematic view of an optically-induced microparticle device according to an embodiment of the disclosure. Referring to FIG. 8, in the embodiment, an optically-induced microparticle device 10 comprises a projection device 100, an optically-induced dielectrophoresis plate 200a, a control unit 300 and an image capturing unit 400. Because the optically-induced microparticle device 10 in the embodiment is the application of the projection device 100 in the aforementioned embodiment, same reference numerals as those according to the aforementioned embodiment are used to represent same or similar components, and repetitive explanation of same technical content is likely to be omitted. For a detailed description of this section, reference can be found in the aforementioned embodiment of the disclosure, therefore no further description is contained herein.

As described above, the optically-induced dielectrophoresis plate 200a is adapted to generate an optically-induced dielectrophoresis force to drive a plurality of microparticles performing dielectrophoretic motion. In the embodiment, a material of the optically-induced dielectrophoresis plate 200a comprises hydrogenated amorphous silicon (a-Si:H), amorphous selenium (a:Se) or other photosensitive polymer material. The projection device 100 comprises the image unit 110 and the projection lens 120. The image unit 110 is adapted to generate an image. The projection lens 120 is disposed on a projection path of the image and located between the image unit 110 and the optically-induced dielectrophoresis plate 200a so as to form a displaying image by projecting the image on the optically-induced dielectrophoresis plate 200a, so that the optically-induced dielectrophoresis plate 200a generates the optically-induced dielectrophoresis force. In the embodiment, the optically-induced dielectrophoresis plate 200a is the same as the projection surface 200 described in the aforementioned embodiment. The control unit 300 is coupled to the projection device 100 so as to control the displaying image projected by the projection device 100. The image capturing unit 400 is coupled to the control unit 300 so as to capture moving images of the plurality of microparticles projected on the optically-induced dielectrophoresis plate 200a and transmit the captured images to the control unit 300. In the embodiment, the control unit 300 is a computer, for example.

As mentioned above, in the optically-induced microparticle device 10 of the embodiment, the magnification ratio of the image provided by the projection lens 120 not only can be switched by interchanging the first lens group 122 and the second lens group 124 of the projection lens 120 with each other, but also by replacing the second lens group 124 with the third lens group 128. Thus, the optically-induced microparticle device 10 can control dimensions of the displaying image projected on the optically-induced dielectrophoresis plate 200a by adjusting the positions of the first lens group 122 and the second lens group 124 or the positions of the first lens group 122 and the third lens group 128 so as to improve the multi-functionality and make the dimensions of the displaying image conform with the dimensions of the optically-induced dielectrophoresis plate 200a to achieve the effect of full displaying image projection. The efficiency of the optically-induced microparticle device 10 can be further improved.

In summary, the magnification ratio of the image provided by the projection lens can be switched by the methods such as interchanging the positions of the lens groups of the projection lens with each other or replacing the original lens group. Thus, the projection device and the optically-induced microparticle device using the projection lens can control dimensions of the displaying image projected on the projection surface by adjusting the positions of the lens groups so as to improve the multi-functionality. Furthermore, the dimensions of displaying image can conform with the dimensions of the projection surface, so that the projection device and the optically-induced microparticle device using the projection lens can achieve the effect of full displaying image projection, and the efficiency of the projection device and the optically-induced microparticle device can be further improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A projection lens, capable of projecting an image of an object to a projection surface, the projection lens comprising:
   a first lens group, disposed on a projection path of the image;
   a second lens group, disposed on the projection path of the image; and
   an aperture, disposed on the projection path of the image and located between the first lens group and the second lens group, the first lens group and the second lens group being configured to interchange with each other for switching magnification ratio of the image provided by the projection lens,
   wherein the projection lens has a first magnification ratio in a first state, when the first lens group is located between the object and the aperture, and the second lens group is located between the aperture and the projection surface, and
   the projection lens has a second magnification ratio in a second state, when the first lens group is located between the projection surface and the aperture, and the second lens group is located between the aperture and the object, the first magnification ratio being different from the second magnification ratio.

2. The projection lens as claimed in claim 1, wherein the first magnification ratio is greater than 1, and the second magnification ratio is less than 1.

3. The projection lens as claimed in claim 1, further comprising a third lens group, adapted to replace the second lens group, wherein the projection lens has a third magnification ratio in a third state, when the first lens group is located between the object and the aperture, and the third lens group replaces the second lens group and is located between the aperture and the projection surface.

4. The projection lens as claimed in claim 3, wherein the first magnification ratio is greater than 1, and the third magnification ratio is less than 1.

5. A projection device, capable of projecting an image to a projection surface as a displaying image, the projection device comprising:
   an image unit, adapted to generate the image; and
   a projection lens, disposed on a projection path of the image and located between the image unit and the projection surface so as to form the displaying image by projecting the image on the projection surface, the projection lens comprising:
  a first lens group, disposed on the projection path of the image;
  a second lens group, disposed on the projection path of the image; and
  an aperture, disposed on the projection path of the image and located between the first lens group and the second lens group, the first lens group and the second lens group being configured to interchange with each other for switching magnification ratio of the image provided by the projection lens,
  wherein the projection lens has a first magnification ratio in a first state, when the first lens group is located between the image unit and the aperture, and the second lens group is located between the aperture and the projection surface, and
  the projection lens has a second magnification ratio in a second state, when the first lens group is located between the projection surface and the aperture, and the second lens group is located between the aperture and the image unit, and the first magnification ratio being different from the second magnification ratio.

6. The projection device as claimed in claim 5, wherein the first magnification ratio is greater than 1, and the second magnification ratio is less than 1.

7. The projection device as claimed in claim 5, further comprising a third lens group, adapted to replace the second lens group and disposed between the image unit and the projection surface, wherein the projection lens has a third magnification ratio in a third state, when the first lens group is located between the image unit and the aperture, and the third lens group replaces the second lens group and is located between the aperture and the projection surface.

8. The projection device as claimed in claim 7, wherein the first magnification ratio is greater than 1, and the third magnification ratio is less than 1.

9. An optically-induced microparticle device, comprising:
  an optically-induced dielectrophoresis plate, adapted to generate an optically-induced dielectrophoresis force to drive a plurality of microparticles performing dielectrophoretic motion;
  an image unit, adapted to generate an image of an object;
  a projection lens, disposed on a projection path of the image and between the image unit and the optically-induced dielectrophoresis plate for forming an displaying image by projecting the image on a projection surface so that the optically-induced dielectrophoresis plate generates the optically-induced dielectrophoresis force, the projection lens comprising:
    a first lens group, disposed on the projection path of the image;
    a second lens group, disposed on the projection path of the image; and
    an aperture, disposed on the projection path of the image and located between the first lens group and the second lens group, the first lens group and the second lens group being configured to interchange with each other for switching magnification ratio, of the image provided by the projection lens,
    wherein the projection lens has a first magnification ratio in a first state, when the first lens group is located between the object and the aperture, and the second lens group is located between the aperture and the projection surface, and
    the projection lens has a second magnification ratio in a second state, when the first lens group is located between the projection surface and the aperture, and the second lens group is located between the aperture and the object, the first magnification ratio being different from the second magnification ratio;
  a control unit, coupled to the projection lens so as to control the displaying image projected by the projection lens; and
  an image capturing unit, coupled to the control unit and capturing moving images of the plurality of microparticles.

10. The optically-induced microparticle device as claimed in claim 9, wherein the first magnification ratio is greater than 1, and the second magnification ratio is less than 1.

11. The optically-induced microparticle device as claimed in claim 9, further comprising a third lens group, adapted to replace the second lens group and disposed between the image unit and the optically-induced dielectrophoresis plate, wherein the projection lens has a third magnification ratio in a third state, when the first lens group is located between the image unit and the aperture, and the third lens group replaces the second lens group and is located between the aperture and the projection surface.

12. The optically-induced microparticle device as claimed in claim 11, wherein the first magnification ratio is greater than 1, and the third magnification ratio is less than 1.

13. The optically-induced microparticle device as claimed in claim 9, wherein a material of the optically-induced dielectrophoresis plate comprises hydrogenated amorphous silicon (a-Si:H), amorphous selenium (a:Se) or other photosensitive polymer material.

* * * * *